United States Patent
Katakura et al.

(10) Patent No.: US 6,574,541 B2
(45) Date of Patent: Jun. 3, 2003

(54) VEHICLE DRIVE SYSTEM

(75) Inventors: Shusaku Katakura, Yokosuka (JP); Masahiro Iriyama, Yokohama (JP); Osamu Ushikubo, Tochigi (JP); Hideki Hyoudou, Yokohama (JP); Kennichirou Murakami, Atsugi (JP)

(73) Assignee: Nissian Motor Co., Ltd., Yokohama (JP)

( * ) Notice: Subject to any disclaimer, the term of this patent is extended or adjusted under 35 U.S.C. 154(b) by 0 days.

(21) Appl. No.: 10/021,075

(22) Filed: Dec. 19, 2001

(65) Prior Publication Data
US 2002/0082759 A1 Jun. 27, 2002

(30) Foreign Application Priority Data

Dec. 22, 2000 (JP) ........................................ 2000-389926

(51) Int. Cl.$^7$ ........................... F02D 41/34; F16H 59/36
(52) U.S. Cl. .............................. 701/54; 701/51; 701/55; 477/98; 477/46; 477/47; 477/111; 477/121; 123/399; 123/478
(58) Field of Search ............................... 701/54, 57, 51, 701/55; 477/46, 47, 48, 110, 120, 111, 121, 901, 98; 123/399, 478, 492, 493

(56) References Cited

U.S. PATENT DOCUMENTS

| 5,735,244 A | * | 4/1998 | Machida et al. | ............ 123/399 |
| 5,842,948 A | * | 12/1998 | Yuasa et al. | ................... 477/48 |
| 5,871,417 A | * | 2/1999 | Suzuki | ........................ 477/43 |
| 6,013,006 A | * | 1/2000 | Ashizawa et al. | ............. 477/46 |
| 6,023,647 A | * | 2/2000 | Saito et al. | ..................... 701/57 |
| 6,188,943 B1 | * | 2/2001 | Uchida et al. | ................. 701/54 |
| 6,220,987 B1 | * | 4/2001 | Robichaux et al. | ............ 477/97 |
| 6,254,510 B1 | * | 7/2001 | Rauch et al. | ............... 477/132 |
| 6,295,498 B1 | * | 9/2001 | Gleason et al. | ................ 701/55 |
| 6,328,671 B1 | * | 12/2001 | Nakajima et al. | ............. 477/46 |

FOREIGN PATENT DOCUMENTS

JP         11-078620         3/1999

* cited by examiner

Primary Examiner—Thomas G. Black
Assistant Examiner—Tuan C To

(57) ABSTRACT

A controller 10 calculates a target drive force based on an accelerator pedal operation amount and a vehicle speed. A delay speed ratio which varies with a delay with respect to the actual speed ratio is calculated by applying a delay process on the actual speed ratio of the transmission 2. While the actual speed ratio is undergoing variation, a target engine torque is calculated by dividing the target drive force by the delay speed ratio. The torque of the engine 1 is controlled so that the torque of the engine 1 coincides with the target engine torque. In this manner, it is possible to suppress shift shocks by eliminating sharp variation of the target engine torque during actual speed change.

12 Claims, 18 Drawing Sheets

VEHICLE DRIVE SYSTEM

FIELD OF THE INVENTION

This invention relates to a vehicle drive system. In particular, this invention relates to a system provided with an automatic transmission which has a plurality of gear positions and which varies a speed ratio in a step manner.

BACKGROUND OF THE INVENTION

JP-A-H11-78620 published by the Japanese Patent Office in 1999 discloses a vehicle drive system. This system is used in a vehicle mounting a continuously variable transmission (CVT). A target engine torque is calculated by dividing a target drive force by the actual speed ratio (ratio of the output rotation speed to the input rotation speed of the transmission). In this manner, an optimal target engine torque is produced which constantly corresponds to the speed ratio without the need for a complicated control routine. Furthermore the step change of the drive force before and after the speed change is suppressed.

Since a CVT performs continuous and smooth variation of a speed ratio, the target engine torque does not undergo sharp variation even when calculated in the above manner.

SUMMARY OF THE INVENTION

However when the drive force control is performed in a vehicle provided with an automatic transmission in which sharp variation in the speed ratio occurs over a short period of time, when the target engine torque is calculated by dividing the target drive force by the actual speed ratio in the above manner, the target engine torque, that is to say, the input torque to the transmission undergoes sharp variation during speed change.

If it were possible to make the timing of variation in the actual speed ratio completely coincide with the timing of variation in target engine torque, it would be theoretically possible to prevent the generation of shift shocks by making the realized drive force equal the target drive force. However in practice, shift shocks result from a degree of deviation between the respective timings. Furthermore attempts to align the respective timings require minute regulation of the speed change timing including regulation of the hydraulic control system of the transmission. In particular, since the target engine torque undergoes sharp variation for the reasons outlined above, considerable difficulty is encountered in varying the speed ratio with respect to the target engine torque.

It has been proposed to solve the above problems by generating a target engine torque during speed change without reference to the actual speed ratio. However although this arrangement is effective in suppressing shift shocks, the resulting drive force does not obtain the desired target drive force due to fluctuations in speed change time. Therefore the drive force fluctuates before and after speed change and a differential results in the drive force.

It is therefore an object of this invention to prevent the generation of shift shocks by suppressing sharp variation in the engine torque during speed change when controlling the drive force of a vehicle provided with an automatic transmission which varies a speed ratio in a step manner.

In order to achieve above object, this invention provides a vehicle drive system comprising an engine, an automatic transmission connected to the engine, the transmission provided with a plurality of gear positions and varying a speed ratio in a step manner, a sensor which detects a running condition of the vehicle and a controller. The controller functions to calculate a target drive force based on the running condition of the vehicle, calculate a delay speed ratio which varies with a delay on an actual speed ratio of the transmission, calculate a target engine torque by dividing the target drive force by the actual speed ratio during steady-state conditions, and calculate the target engine torque by dividing the target drive force by the delay speed ratio while the actual speed ratio is undergoing variation and control the engine torque so that the engine torque coincides with the target engine torque.

The details as well as other features and advantages of this invention are set forth in the remainder of the specification and are shown in the accompanying drawings.

DESCRIPTION OF THE PREFERRED EMBODIMENTS

Figure 1:
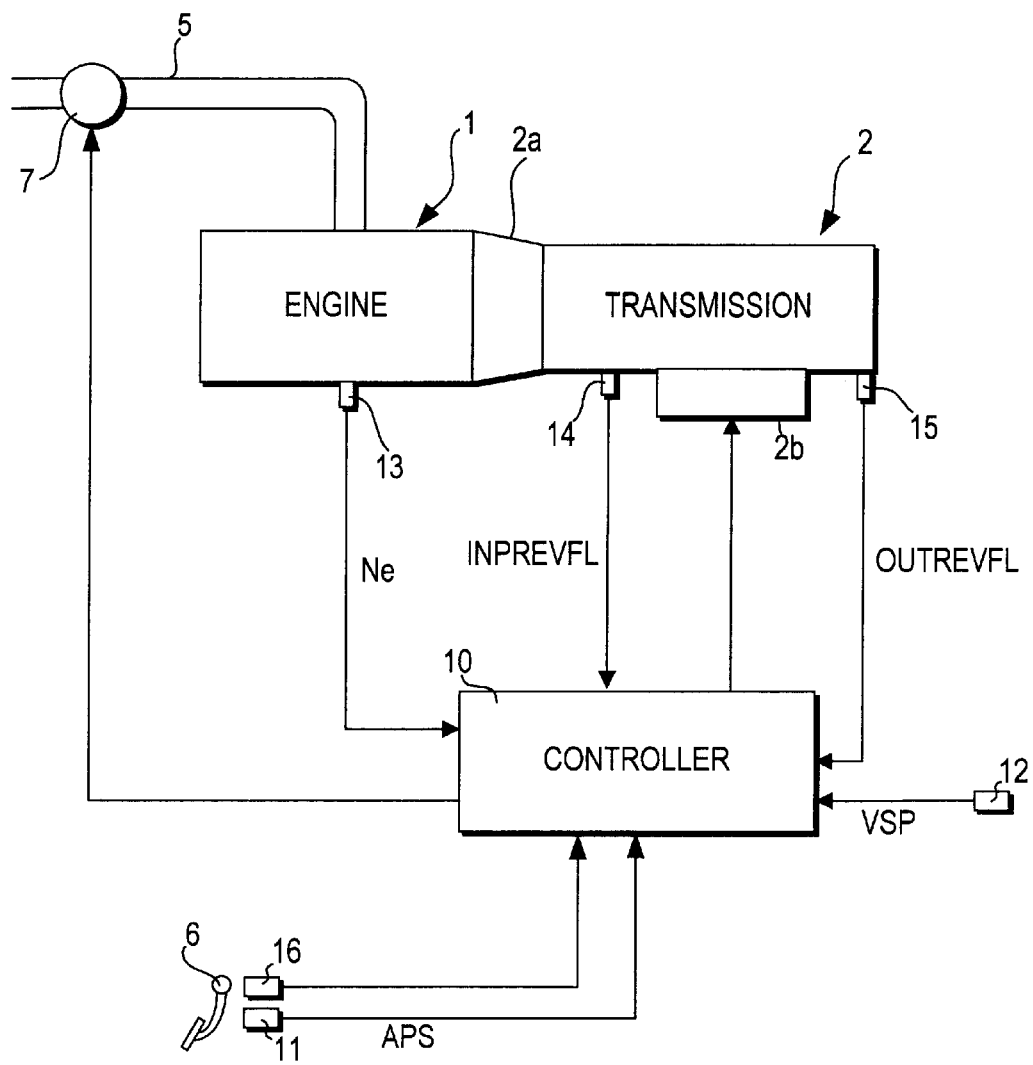
FIG. 1 is a schematic diagram of a vehicle drive force system according to this invention.
Figure 2:
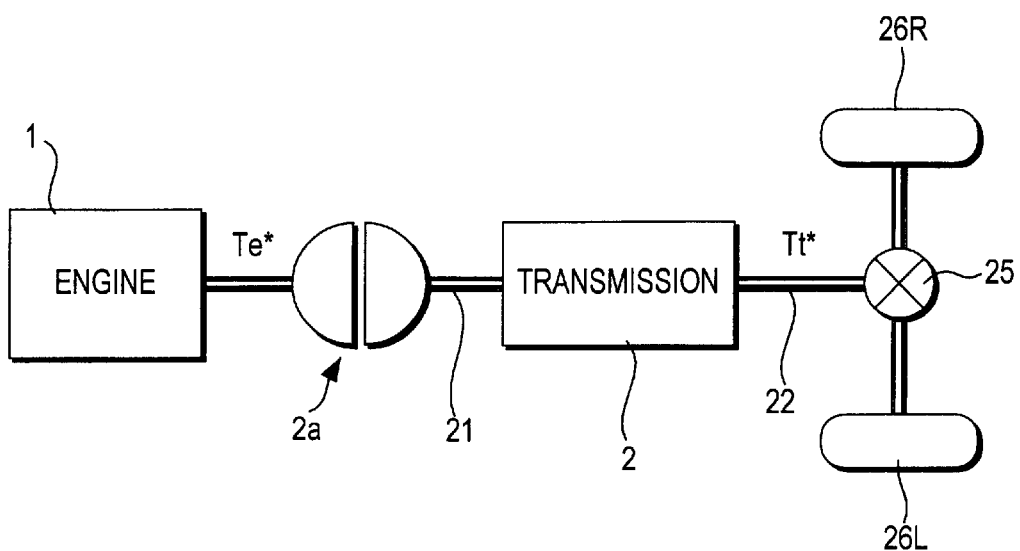
FIG. 2 is a schematic diagram of a power train for the vehicle.

Referring to FIG. 1 and FIG. 2 of the drawings, an automatic transmission 2 is connected to an engine 1 with a torque converter 2a interposed therebetween.

An electronically controlled throttle 7 is provided in an intake air passage 5 of the engine 1 in order to control a throttle opening independently from the operation of the acceleration pedal by the driver. The torque of the engine 1 is transmitted to drive wheels 26R, 26L via the torque converter 2a, the transmission 2, an output shaft 22 and a differential gear 25.

The transmission 2 is provided with a planetary gear set, a clutch, a band brake and a hydraulic control circuit 2b. This transmission 2 can vary the speed ratio in a step manner, for example, by performing step variation of the speed ratio by switching the gear position between any of the first to fifth gears and reverse gear. The speed ratio is the ratio of the output rotation speed to the input rotation speed of the transmission 2.

A shift solenoid, a line pressure solenoid, a lock-up solenoid and the like are provided in the hydraulic control circuit 2b. These solenoids are controlled by a controller 10.

Signals from an accelerator pedal operation sensor 11 which detects an operation amount APS of an accelerator pedal 6, a vehicle speed sensor 12 which detects a vehicle speed VSP, an engine rotation speed sensor 13 which detects an engine rotation speed Ne, an input rotation speed sensor 14 which detects a rotation speed INPREVFL of the transmission input shaft 21, an output rotation speed sensor 15 which detects a rotation speed OUTREVFL of the transmission output shaft 22, an idle switch 16 which detects that the accelerator pedal 6 is released, and from an inhibitor switch 18 which detects the position of a select lever 17 are input into the controller 10. The controller 10 selects a gear position by looking up a predetermined shift map based on the accelerator operation amount APS and the vehicle speed VSP and then switches the gear of the transmission 2 by switching the shift solenoid of the hydraulic control circuit 2b between the ON and the OFF positions.

The controller 10 controls fuel injection and performs other necessary engine control in order to obtain optimal fuel efficiency and exhaust emission control based on engine operating parameters such as the engine rotation speed Ne. The controller 10 controls the opening of the throttle 7 in order to realize a target engine torque calculated based on the accelerator pedal operation amount APS and the vehicle speed VSP.

Figure 3:
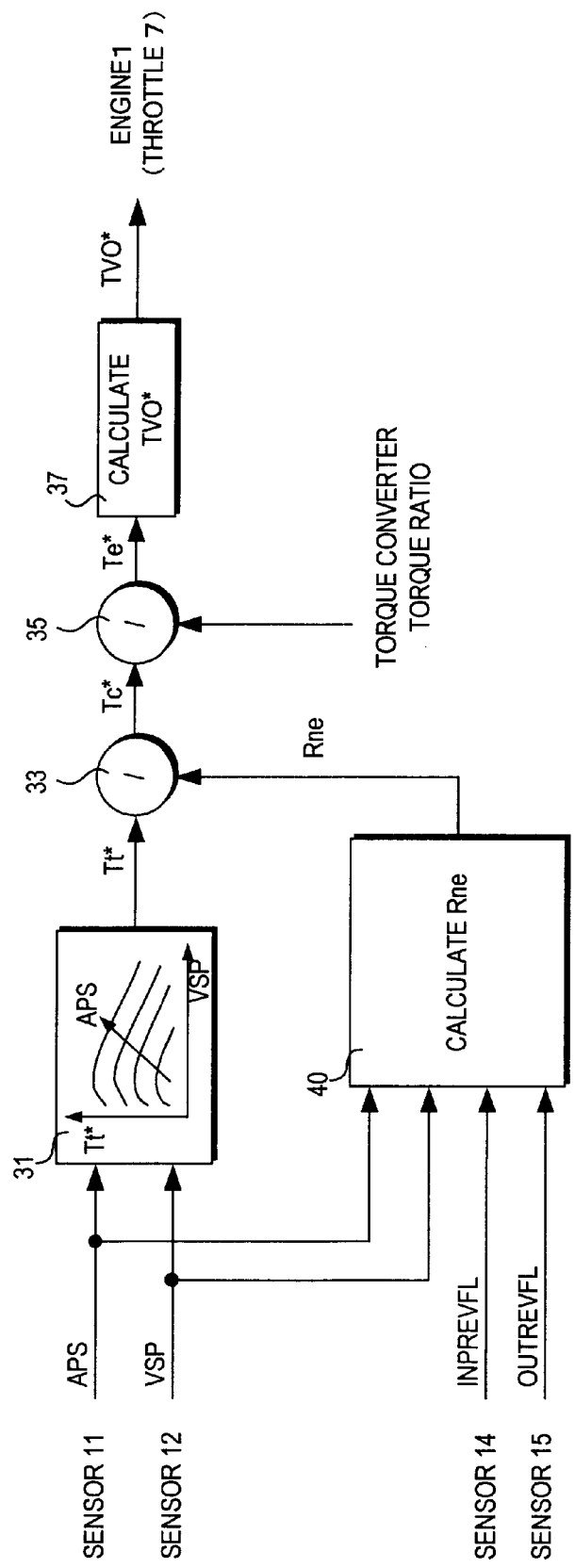
FIG. 3 is a block diagram of drive force control.

FIG. 3 is a block diagram of drive force control performed by the controller 10. As shown in the figure, drive force control comprises a block 31 which calculates a target drive force, dividers 33, 35, a block 37 which calculates a target throttle opening, and a block 40 which calculates a speed ratio for calculation of the target engine torque.

Processing operations performed by each of the above elements will be described hereafter. The block 31 calculates a target drive force Tt* for the vehicle based on vehicle running conditions (accelerator pedal operation amount APS and vehicle speed VSP). The block 31 calculates the target drive force Tt* corresponding to the vehicle speed VSP and the accelerator pedal operation amount APS at a given instant by looking up a predetermined target drive force characteristics map.

Figure 4:
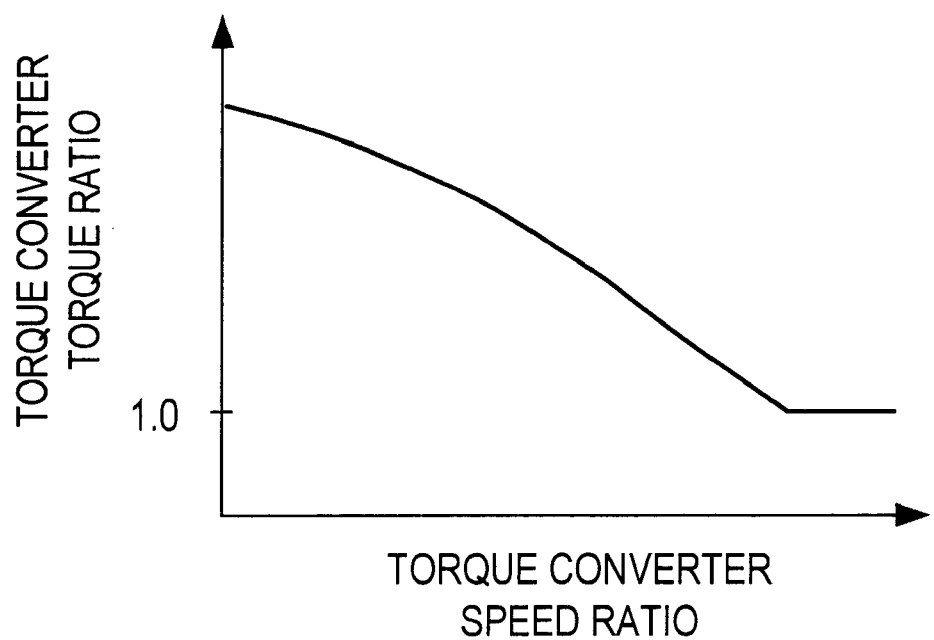
FIG. 4 is a table for calculating the torque ratio of the torque converter.

The divider 33 calculates a target converter torque TC* by dividing the target drive force Tt* by a speed ratio Rne from the block 40 which is used for calculating the target engine torque (described hereafter). The divider 35 calculates a target engine torque Te* by dividing the target converter torque Tc* by a torque ratio of the torque converter 2a obtained by looking up a table of characteristics showing the relation of the torque converter torque ratio and the torque converter speed ratio as shown in FIG. 4. The torque converter speed ratio is the ratio of the transmission input rotation speed INPREVFL and the engine rotation speed Ne.

Figure 5:
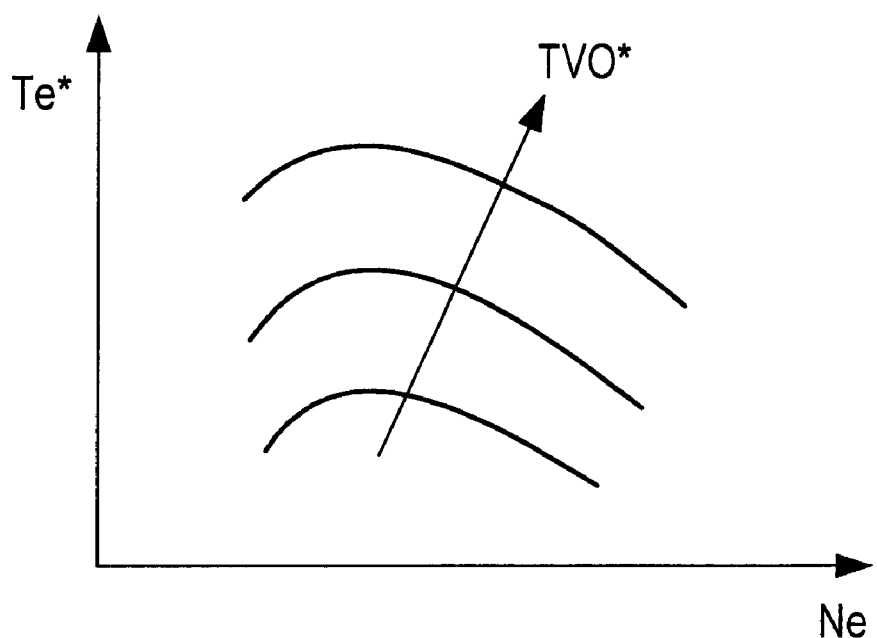
FIG. 5 is a map for calculating the target throttle opening.

The block 37 calculates a target value TVO* for the throttle opening required to realize the target engine torque Te*. The target throttle opening TVO* is calculated by looking up a characteristics map as shown in FIG. 5 based on the target engine torque Te* and the engine rotation speed Ne. The controller 10 controls the torque of the engine 1 by controlling the throttle 7 so that the opening of the throttle 7 coincides with the target throttle opening TVO*.

The block 40 outputs a delay speed ratio Rd as the speed ratio Rne for calculating the target engine torque Te* from the target drive force Tt*. The delay speed ratio Rd has a delay with respect to the actual speed ratio Rr and suppresses the generation of shift shocks resulting from sharp variation in the engine torque when the transmission 2 is undergoing speed change. When speed change control is not performed, that is to say, during steady state conditions, a speed ratio (=actual speed ratio) is output which corresponds to the gear position at that time. "During speed change control" means that a period until the delay speed ratio after completion of actual speed change reaches the actual speed ratio is added to a period (actual speed change period) in which the speed ratio of the transmission 2 is undergoing variation.

Figure 6:
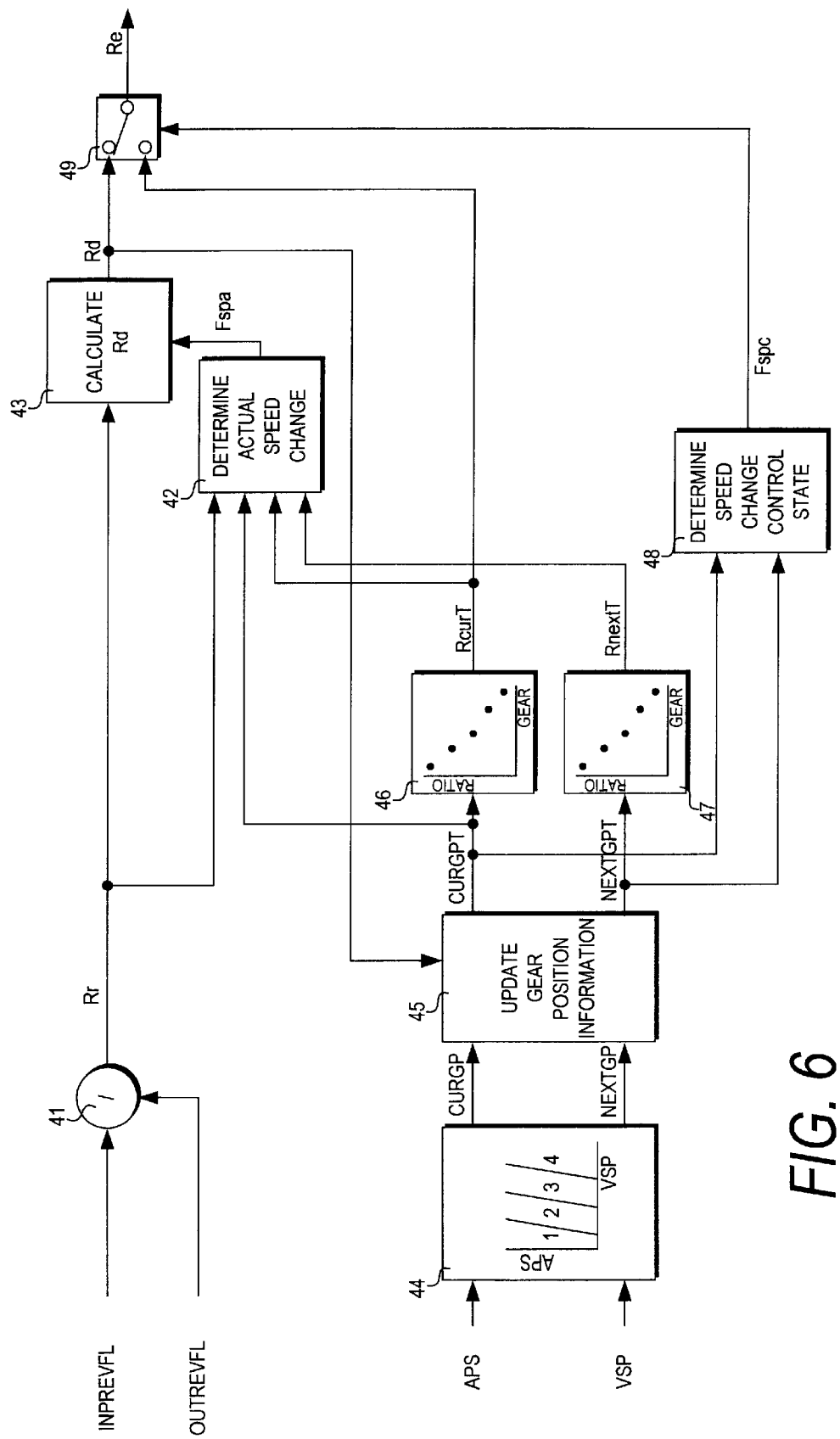
FIG. 6 is a block diagram showing the calculation process of a speed ratio for calculation of the target engine torque.

FIG. 6 shows a calculation process of the speed ratio for calculating the target engine torque which is performed by the block 40.

As shown in the figure, the calculation process of the speed ratio for calculation of the target engine torque comprises a divider 41, a block 42 which determines actual speed change, a block 43 which calculates the delay speed ratio, a block 44 which determines the gear position, a block 45 which updates a gear position information, blocks 46, 47 which convert the gear position to a corresponding speed ratio, a block 48 which determines a speed change control state, and a block 49 which selects the speed ratio for calculating the target engine torque. Processing operations performed by each of the above elements will be described hereafter.

The divider 41 calculates the actual speed ratio Rr by dividing the input shaft rotation speed INPREVFL by the output shaft rotation speed OUTREVFL of the transmission 2 as detected by sensors 14, 15.

The actual speed ratio Rr and the speed ratios RcurT, RnextT corresponding to the gear position CURGPT before speed change and the gear position NEXTGPT after speed change which are used for speed change control as described below are input into the block 42. Based on these inputted parameters, the block 42 determines the timing at which the speed ratio of the transmission starts to vary and the timing at which the speed ratio variation is completed. Furthermore the block 42 determines whether or not the speed ratio of the transmission 2 is varying, that is to say, whether actual speed change is performed or not. This determination routine is performed in order to apply an optimal delay to the delay speed ratio Rd to suppress shift shocks during actual speed change of the transmission and to apply an optimal delay to the delay speed ratio Rd to suppress the sharp variation in the drive force after completion of actual speed change.

Figure 7:
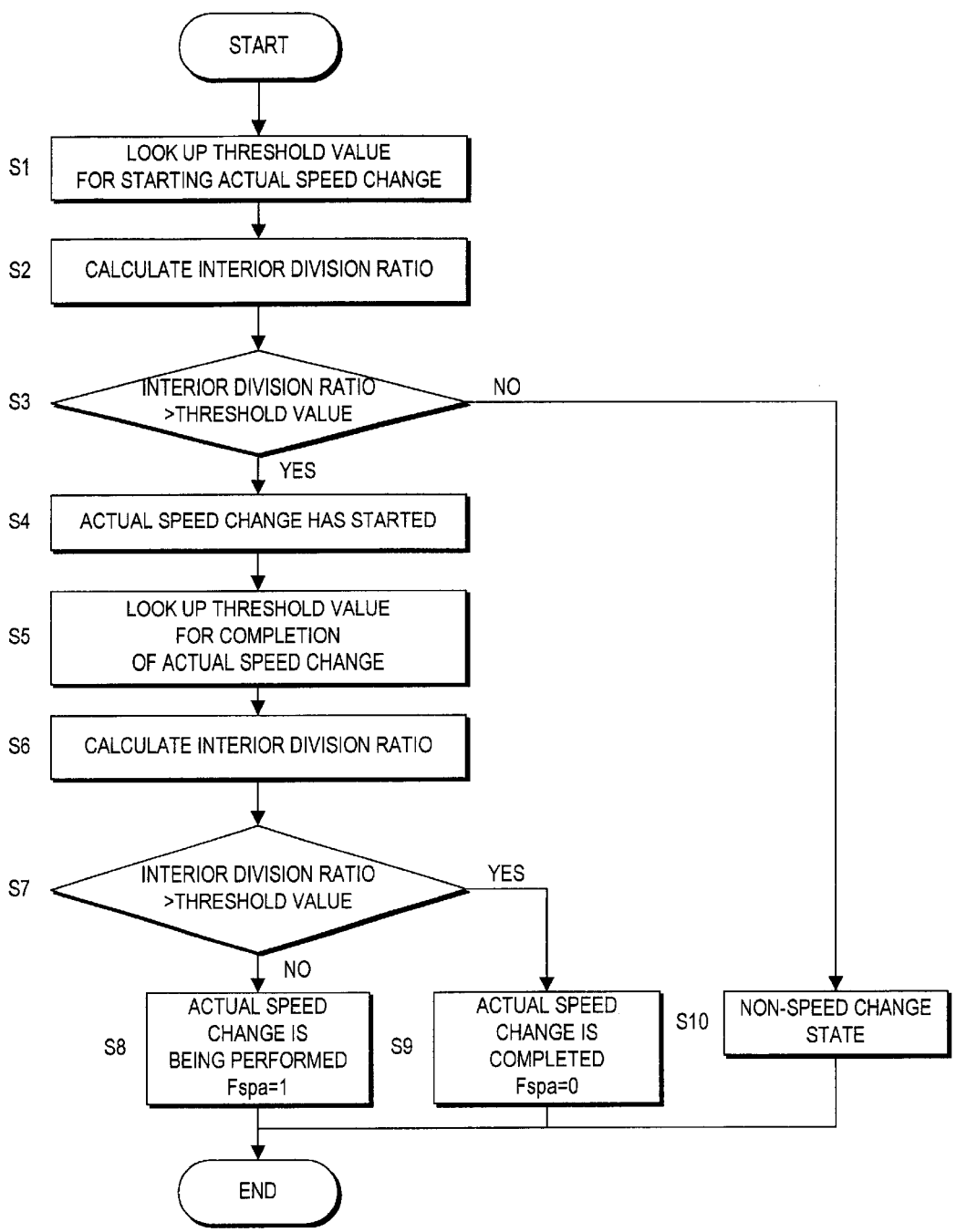
FIG. 7 is a flowchart showing an actual speed change determination process.

FIG. 7 shows a determination process for actual speed change performed by the block 42. FIG. 7 shows the process of determining a timing for starting actual speed change and a timing for completing actual speed change when performing an upshift and of determining whether or not the transmission 2 is performing actual speed change. The process performing during downshift is the same.

Firstly in a step S1, a determination threshold value for starting actual speed change is calculated by looking up a predetermined table based on the gear position CURGPT before speed change (described below). The determination threshold value for starting actual speed change is set to a value slightly larger than zero, for example 0.1.

Then in a step S2, an interior division ratio (=(Rr−RcurT)/(RnextT−RcurT)) is calculated based on the actual speed ratio Rr, the speed ratio RcurT before speed change and the speed ratio RnextT after speed change. The interior division ratio takes a value of zero when the actual speed ratio Rr before starting speed change operations equals the speed ratio RcurT before speed change. However it approaches a value of one as the actual speed ratio Rr approaches the speed ratio RnextT after speed change during the course of speed change operations.

In a step S3, the determination threshold value for starting actual speed change is compared to the interior division ratio above. The routine proceeds to a step S4 when the interior division ratio is larger than the determination threshold value for starting actual speed change and it is determined that actual speed change has started.

Then in a step S5, a determination threshold value for completion of actual speed change is calculated by looking up a predetermined table based on the gear position CURGPT before speed change. The determination threshold value for completion of actual speed change is set to a value slightly smaller than one, for example 0.9. In a step S6, an interior division ratio (=(Rr−RcurT)/(RnextT−RcurT)) is calculated in the same manner as the step S2.

In a step S7, it is determined whether or not the interior division ratio is greater than the threshold value for completion of actual speed change. When the interior division ratio is smaller than the threshold value after completion of actual speed ratio, the routine proceeds to a step S8 and it is determined that the routine is still being performed actual speed change and an actual speed change flag Fspa is set to "1" indicating that the actual speed change is still performing. In contrast, when the interior division ratio is greater than the threshold value for completion of actual speed change, the routine proceeds to a step S9. In the step S9, it is determined that actual speed change is completed and the actual speed change flag Fspa is set to "0" indicating completion of actual speed change.

On the other hand, when it is determined in the step S3 that the interior division ratio is smaller than the threshold value for starting actual speed change, the routine proceeds to a step S10. In the step S10, it is determined that speed change is not performed and the routine is terminated.

Figure 8:
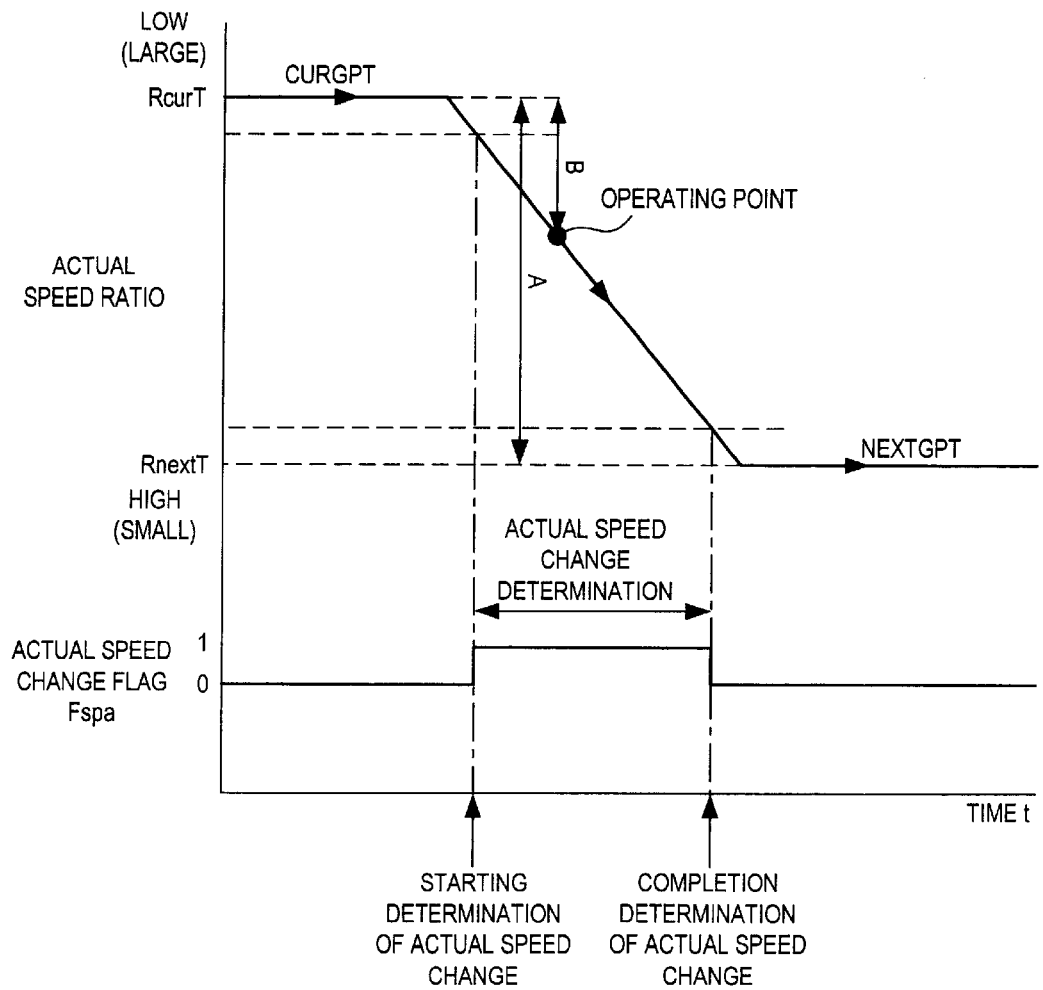
FIG. 8 is a time chart showing the determination of the actual speed change during upshift.

FIG. 8 shows the determination of actual speed change. FIG. 8 shows the situation in which the actual speed ratio Rr varies from the speed ratio RcurT before speed change to the speed ratio RnextT (smaller than RcurT) after speed change as a result of an upshift. The interior division ratio (=(Rr−RcurT)/(RnextT−RcurT)=B/A in the figure) increases as the speed change operation proceeds.

The block 42 determines that actual speed change has started when the interior division ratio becomes greater than the threshold value for starting actual speed change. Furthermore it determines that the actual speed change is completed when the interior division ratio becomes greater than the threshold value for completion of actual speed change as speed change operations proceed. The reason it is not immediately determined that actual speed change has started when the actual speed ratio Rr becomes smaller than the speed ratio RcurT before speed change and it is determined that actual speed change is completed before the actual speed ratio Rr reaches the speed ratio RnextT after speed change is to take into account the delay in speed change operations or the detection accuracy of the sensor.

A calculation process for the delay speed ratio performed by the block 43 in FIG. 6 will be described below. A delay speed ratio Rd is calculated so as to have a predetermined delay with respect to the actual speed ratio Rr by a delay speed ratio calculation process. It is determined whether or not actual speed change is performed based on the value of the actual speed change flag Fspa output by the block 42 and the amount of delay is varied in response to whether or not actual speed change is performed.

Figure 9:
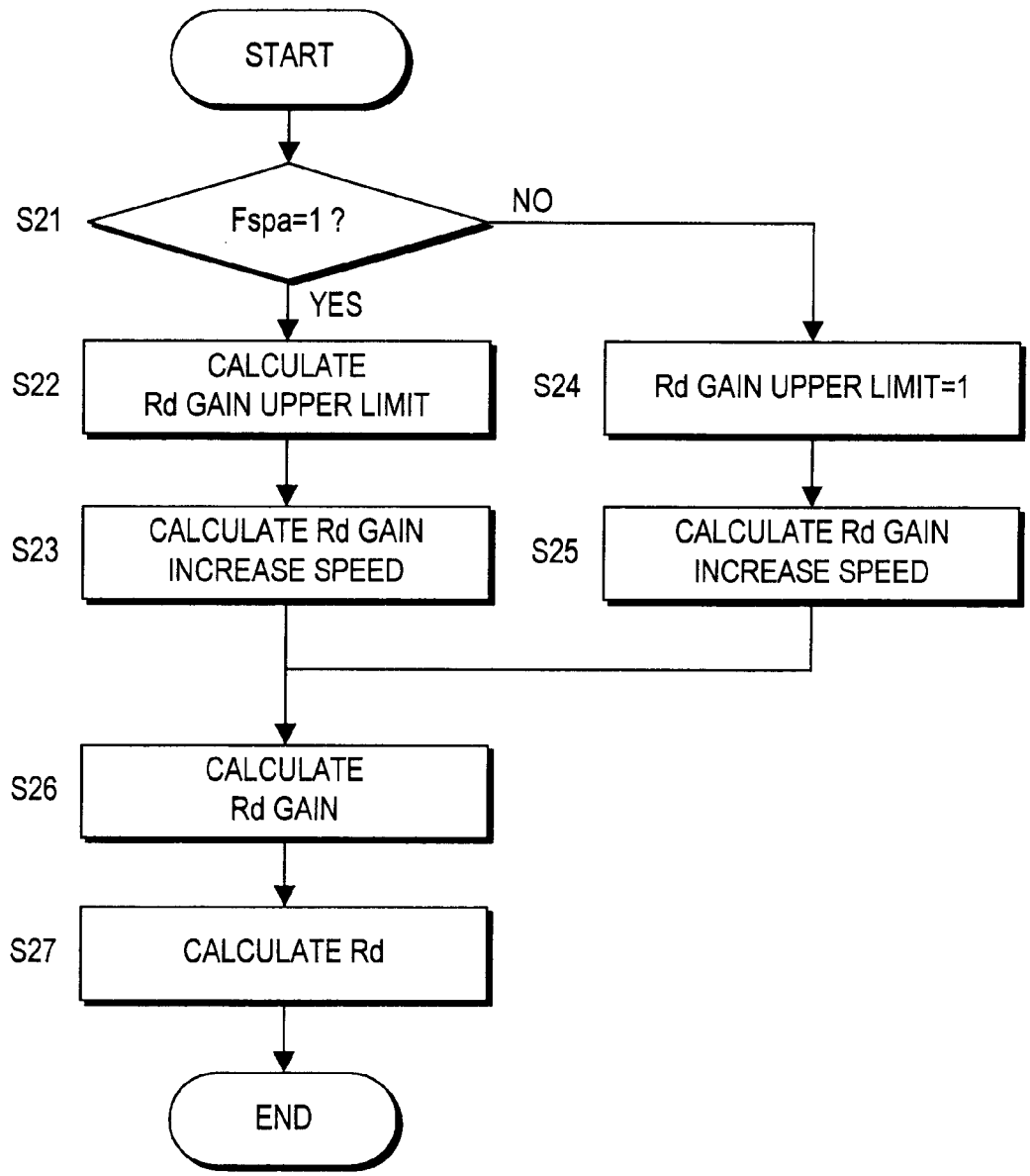
FIG. 9 is a flowchart showing the calculation process for a delay speed ratio.

FIG. 9 shows a calculation process for the delay speed ratio performed by the block 43. This shows the process performed during upshift.

Firstly in a step S21, it is determined whether or not actual speed ratio is performed based on the value of the actual speed change flag Fspa. When it is determined that actual speed change is being performed (Fspa=1), the routine proceeds to a step S22.

In the step S22, an upper limit of the Rd gain is calculated based on the gear position, the vehicle speed VSP and the accelerator pedal operation amount APS by looking up a delay upper limit map for actual speed change. The upper limit of the Rd gain is set to a value which is smaller than one. The Rd gain is a value showing the amount of delay of the delay speed ratio Rd to the actual speed ratio. The delay speed ratio Rd approaches the actual speed ratio Rd as the Rd gain approaches a value of one. It is possible to regulate the variable speed of the target engine torque by regulating the value for Rd gain.

In a step S23, an increase speed of the Rd gain is calculated based on the gear position, the vehicle speed VSP and the accelerator pedal operation amount APS by looking up a delay map for actual speed change. The delay map used at this point is set based on experimental results so that the optimal Rd gain increase speed for suppressing shift shocks during speed change is obtained.

On the other hand, when it is determined in the step S21 that actual speed change is not being performed, the routine proceeds to a step S24. In the step S24, the upper limit of the Rd gain is set to one and the increase speed of the Rd gain is calculated in a step S25 based on the gear position, the vehicle speed VSP and the accelerator pedal operation amount APS by looking up a delay map after completion of actual speed change. The delay map used at this point is set based on experimental results so that the optimal Rd gain increase speed for suppressing the sharp variation in the drive force is obtained.

In a step S26, the Rd gain is calculated from the equation below in order not to exceed the Rd gain upper limit.

$$Rd \text{ gain} = \text{Min}(Rd \text{ gain upper limit}, Rd \text{ gain} + Rd \text{ gain increase speed})$$

The Rd gain is a value which shows the amount of delay of the delay speed ratio Rd to the actual speed ratio Rr.

Then in a step S27, the delay speed ratio Rd is calculated from the equation below.

$$Rd = (\text{actual speed ratio} - \text{speed ratio before speed change}) \times Rd \text{ gain} + \text{speed ratio before speed change}$$

Since the upper limit of the Rd gain after completion of actual speed change is set to one, when the Rd gain takes a value of one as the process proceeds, the delay speed ratio Rd becomes equal the actual speed ratio Rr.

Although the flowchart shows the process during an upshift, the process during downshift is the same. However since shift shocks tend to be generated during an upshift as a result of the necessity to forcibly reduce the engine rotation speed with the clutch in the transmission 2, the delay amount during upshift is set to be larger than the delay amount during downshift. That is to say, the increase speed of the Rd gain is set to a smaller value.

Figure 10:
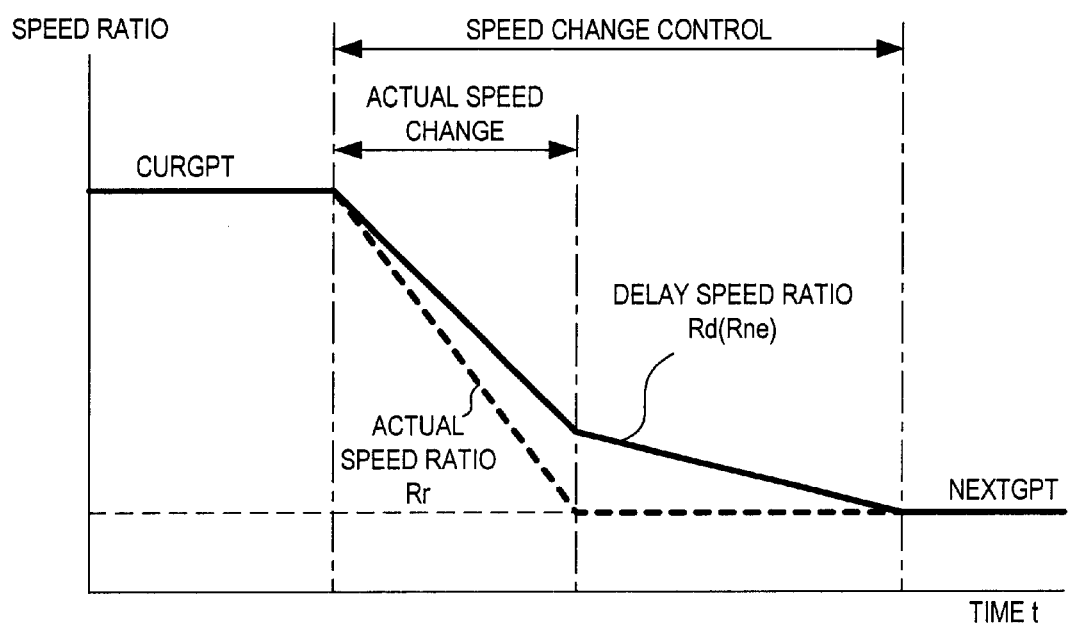
FIG. 10 is a time chart of the delay process.

FIG. 10 shows a delay process applied to a calculation process for a delay speed ratio.

In this manner, during speed change control, the delay speed ratio Rd is calculated as a value having a delay with respect to the actual speed ratio Rr. During an upshift, the value for Rd is smaller than the actual speed ratio Rr and during a downshift, it is larger than the actual speed ratio Rr.

The amount of delay of the delay speed ratio Rd to the actual speed ratio Rr is different during actual speed change in which the speed ratio of the transmission 2 varies and after actual speed change is completed. The difference in the delay before and after the completion of actual speed change allows both shift shocks and sharp variation in the drive force to be suppressed. This is achieved by setting the delay so that shift shocks are largely suppressed until actual speed change is completed and by setting the delay so that the drive force varies smoothly and sharp variation in the drive force do not occur after completion of actual speed change.

A delay is applied which comprises multiplying the gain by the difference of the actual speed ratio Rr and the speed ratio RcurT before speed change. Apart from this method, another method of applying a first order lag process may be used for example. Furthermore a delay may be applied by limiting the speed ratio variable speed as described below.

Figure 11:
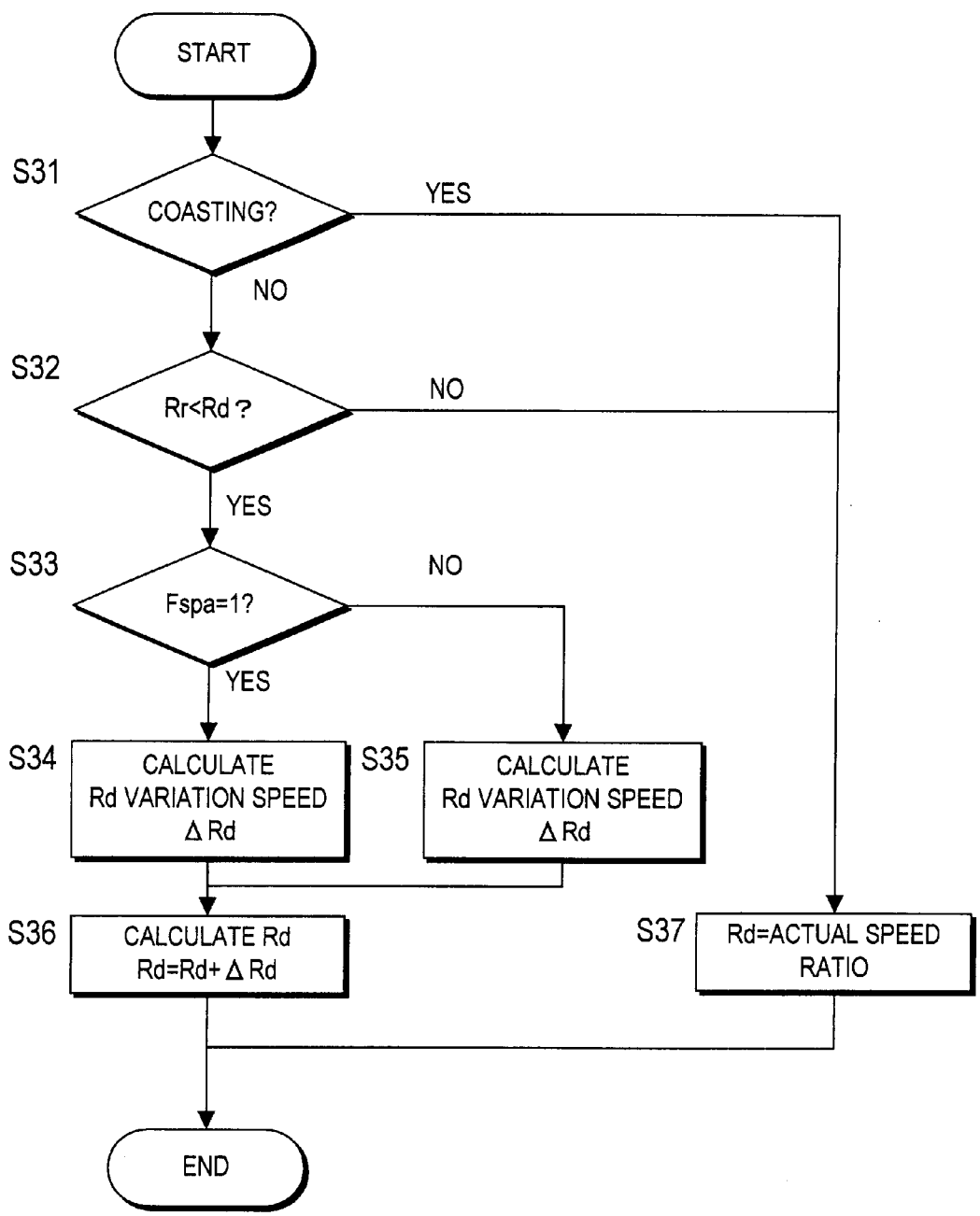
FIG. 11 is a flowchart of another example of a calculation process for the delay speed ratio.

FIG. 11 shows another example of a calculation process for the delay speed ratio performed by the block 43.

Firstly in a step S31, it is determined whether or not the vehicle is in a coasting state (a state of running without the accelerator pedal being depressed). It is possible to determine that the vehicle is coasting by determined whether or not the vehicle speed VSP is greater than a predetermined value and the idle switch is ON (accelerator pedal is OFF). When it is determined that the vehicle is not coasting, the routine proceeds to a step S32. When this is not the case, the routine proceeds to a step S37.

In the step S32, it is determined whether or not an upshift is performed based on whether or not the delay speed ratio Rd is greater than the actual speed ratio Rr. When it is determined that the delay speed ratio Rd is greater than the actual speed ratio Rr and that an upshift is being performed, the routine proceeds to a step S33. When this is not the case, the routine proceeds to a step S37. During an upshift, the delay speed ratio Rd is normally greater than the actual speed ratio Rr during speed change (refer to FIG. 10). Conversely, during a downshift the delay speed ratio Rd is normally smaller than the actual speed ratio Rr. Thus it is possible to determine whether or not an upshift is performed by examining the dimensional relation of the delay speed ratio Rd and the actual speed ratio Rr.

In the step S33, the value for the actual speed change flag Fspa is used to determine whether or not actual speed change is being performed or whether it is completed. During actual speed change (Fspa=1), the routine proceeds to a step S34. After completion of actual speed change (Fspa=0), the routine proceeds to a step S35.

In the step S34, a variable speed ΔRd for the delay speed ratio Rd is calculated based on the gear position, the vehicle speed VSP and the accelerator pedal operation amount APS by looking up a delay map for actual speed change. The delay map used at this point is set based on experimental results so that an optimal Rd variable speed ΔRd for suppressing shift shocks during speed change is obtained.

On the other hand, in the step S35, the Rd variable speed ΔRd is calculated based on the gear position, the vehicle speed VSP and the accelerator pedal operation amount APS by looking up a delay map for after completion of actual speed change. The delay map used at this point is set based on experimental results so that an optimal Rd variable speed ΔRd for varying the drive force smoothly and suppressing the sharp variation in the drive force after actual speed change is obtained.

In the step S36, a delay speed ratio Rd having a delay with respect to the actual speed ratio Rr is calculated by adding an Rd variable speed ΔRd to the previous value of the delay speed ratio Rd.

On the other hand, when it is determined in the step S31 that the vehicle is coasting, or when it is determined in the step S32 that a downshift is performed, the routine proceeds to the step S37, the actual speed ratio Rr is set to the delay speed ratio Rd and the delay process on the speed ratio is prohibited.

The reason the delay process is not performed during coasting is due to the fact that it is difficult to set the speed ratio for calculating the target engine torque which varies the engine torque without generating a sharp variation in the drive force. When a delay is provided in a speed ratio for calculating the target engine torque during an upshift performed when the vehicle is coasting and the accelerator pedal is released for example, the engine torque before a downshift starts deviates due to a timing when a downshift is performed by re-depressing the accelerator pedal after a pedal release operation. In addition, during speed change control while coasting, the control amount of the engine torque is minimized and even when the delay process is prohibited, there is almost no effect on shift shocks.

The reason the delay process is not performed during downshift is because the effect of performing the delay process will not be as effective as during an upshift. In particular, if the delay process is performed only during upshift which displays a tendency for problematic shift shocks during speed change, such shift shocks can be suppressed and it is possible to reduce the load on the control system. However if there is a leeway in the processing capacity of the control system (controller 10), the delay process may be also performed during downshift.

The block 44 in FIG. 6 determines a gear position CURGP before speed change and a gear position NEXTGP after speed change based on the accelerator pedal operation amount APS and the vehicle speed VSP. The gear position CURGP before speed change is a value updated to the gear position NEXTGP after speed change at a time corresponding to the completion of actual speed change (for example, a value updated to the gear position NEXTGP after speed change after a predetermined time measured by a timer has elapsed after starting speed change). The gear position NEXTGP after speed change is a value which is obtained in real time by looking up a shift map as shown in the figure based on the accelerator pedal operation amount APS and the vehicle speed VSP at that time.

The block 45 updates the gear position CURGP before speed change and the gear position NEXTGP after speed change which are used for speed change control at a predetermined timing. CURGPT and NEXTGPT are respectively updated to the gear position CURGP before speed change and the gear position NEXTGP after speed change when speed change control is completed. The reason the values for CURGPT and NEXTGPT used in speed change control are updated with a delay on the gear position CURGP before speed change and the gear position NEX- TGP after speed change is to align control with the delay on the speed ratio used in calculating the target engine torque and to apply the same delay on gear position information used in speed change control.

Figure 12:
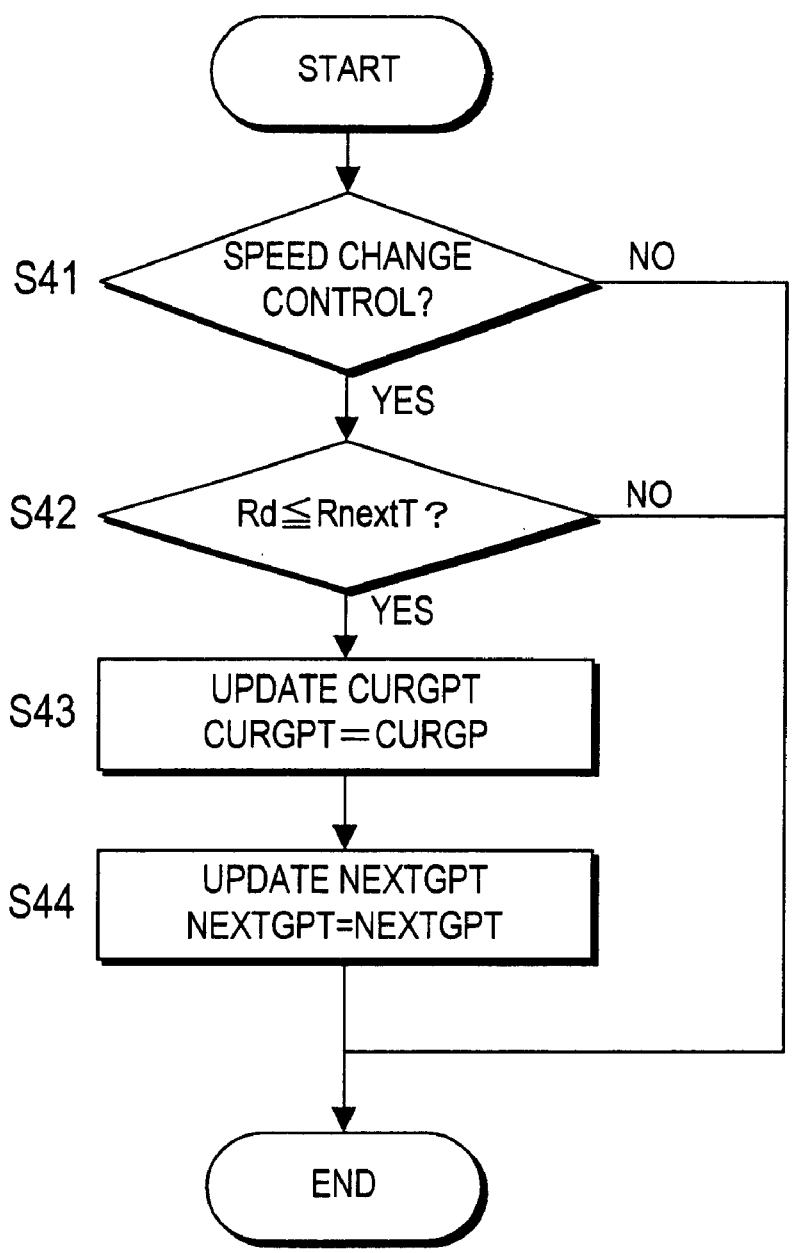
FIG. 12 is a flowchart showing the updating process of gear position information.

FIG. 12 shows the updating process for gear position information performed by the block 45. Although FIG. 12 shows an updating process during upshift, the updating process during downshift is the same with the exception that the sign in the step S42 is reversed. Although not shown in the flowchart, NEXTGPT is updated to the value NEXTGP when speed change control starts (first speed control is started in the case when speed change control is performed sequentially as described below).

Firstly in a step S41, it is determined whether or not speed change control is performed by comparing the values for NEXTGP and CURGPT. When the values are different, it is determined that speed change control is performed and the routine proceeds to a step S42. When this is not the case, it is determined that speed change control is not performed and the routine is terminated.

In the step S42, it is determined whether or not the delay speed ratio Rd is less than a speed ratio RnextT corresponding to NEXTGTP. When the delay speed ratio Rd has become smaller than RnextT, it is determined that the delay speed ratio Rd has reached RnextT and the routine proceeds to a step S43. When the values are equal, it is determined that the routine is before starting actual speed change and the routine proceeds to the step S43. When this is not the case, the process is terminated.

In the step S43, CURGPT is updated to the gear position CURGP before speed change and in a step S44, NEXTGPT is updated to the gear position NEXTGP after speed change.

Figure 13:
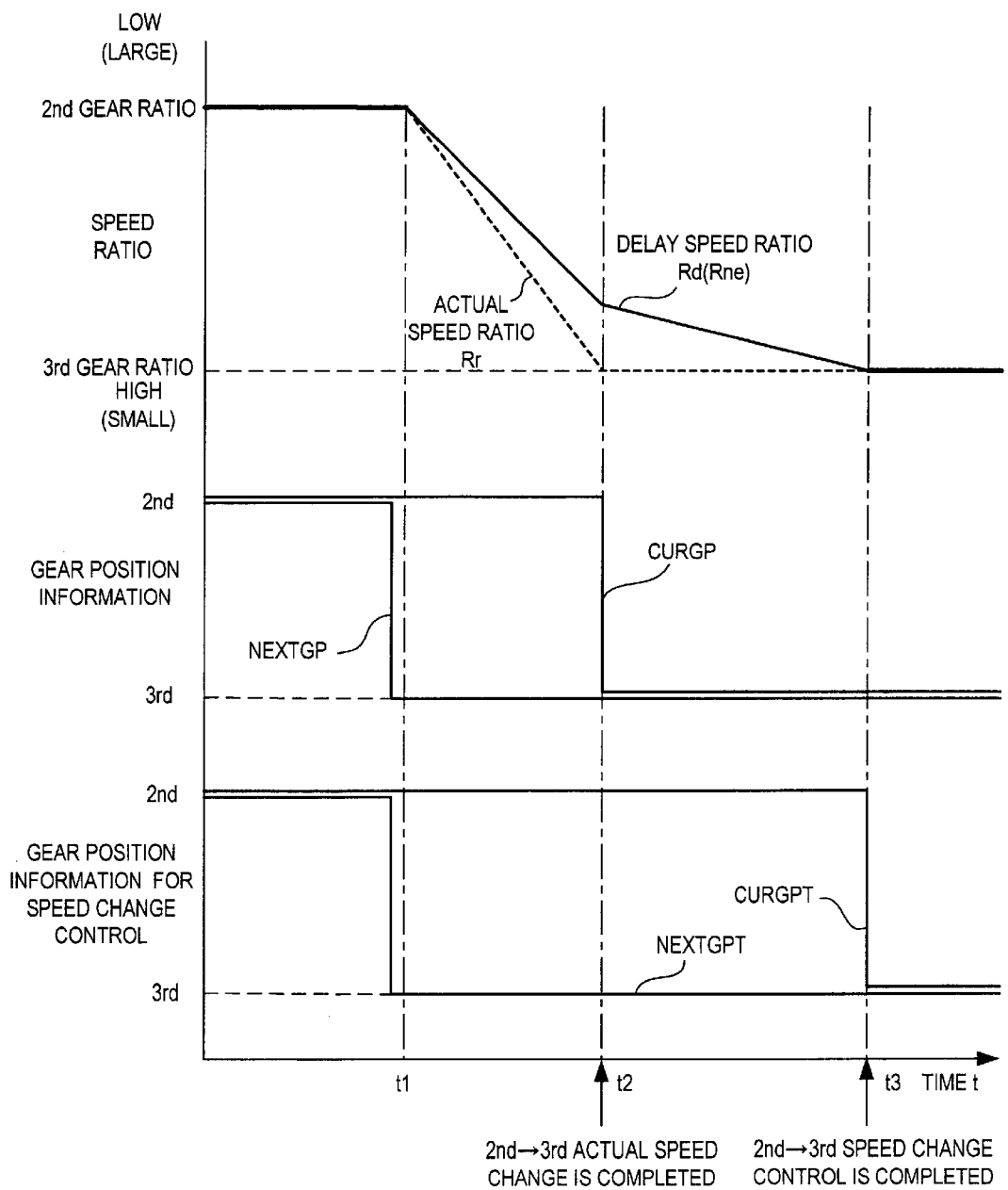
FIG. 13 is a time chart showing the updating process of gear position information during an upshift from a second to a third gear.

FIG. 13 shows the updating of the gear position information (CURGP, NEXTGP) and the gear position information (CURGPT, NEXTGPT) for speed change during an upshift from second gear to third gear.

Speed change control is started at a time t1 when the gear position NEXTGP after speed change is varied as a result of variation in the vehicle running state (APS, VSP). The value NEXTGPT used in speed change control at this time is updated to NEXTGP.

The value for the actual speed ratio Rr varies as the speed change operation proceeds and at a time t2, when the actual speed ratio Rr reaches a speed ratio corresponding to NEXTGPT and actual speed change is completed, the gear position CURGP before speed change is updated to the gear position NEXTGP after speed change. However the value for CURGPT is not updated at this time.

Thereafter when the delay speed ratio Rd reaches the actual speed ratio Rr at a time t3, CURGPT and NEXTGPT are respectively updated to CURGP and NEXTGP. The reason that NEXTGPT is updated as well as CURGPT when speed change control is completed is in order to continue the delay process when speed change control to the next gear position is started while the speed change control from a certain gear position to another gear position is not yet completed.

Figure 14:
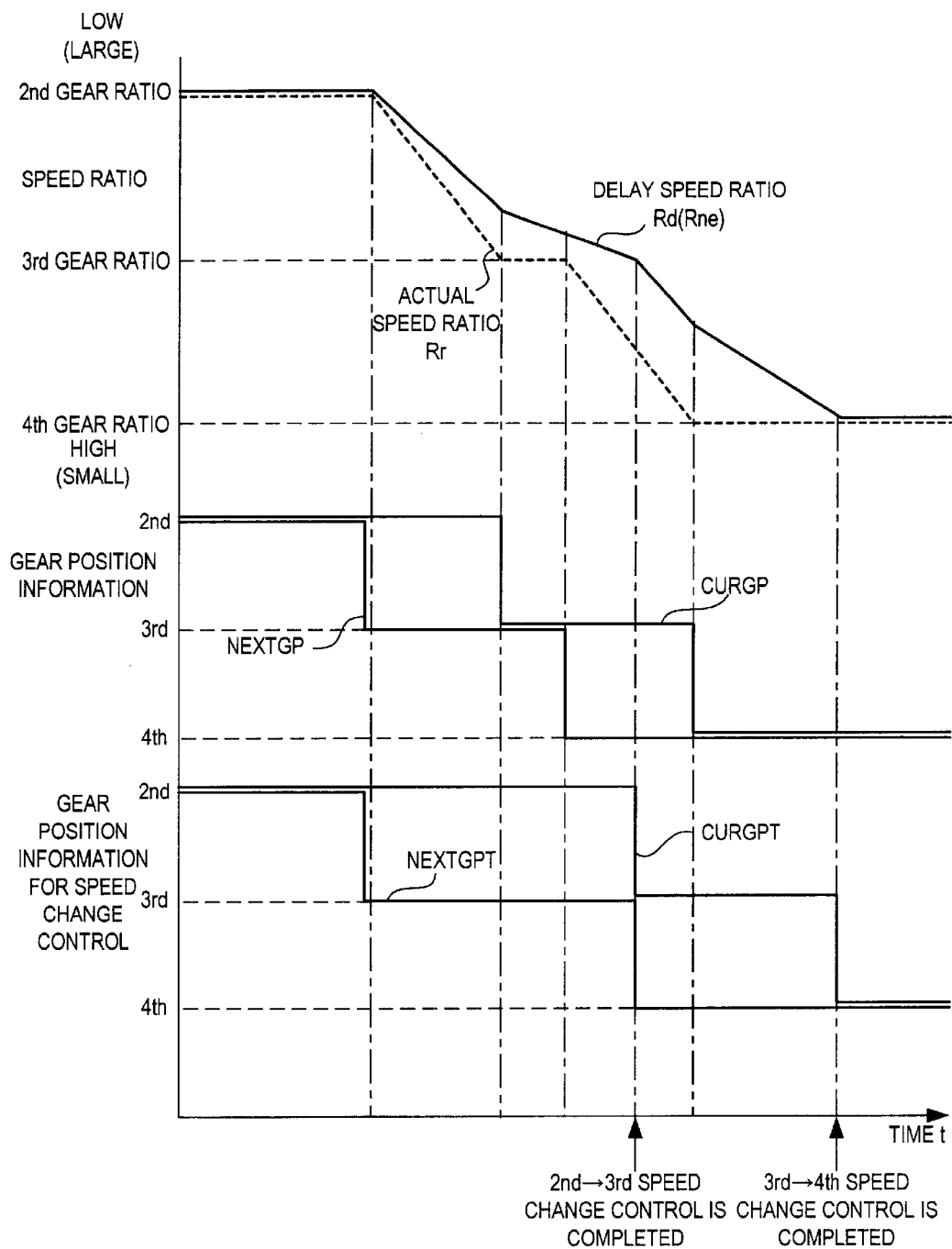
FIG. 14 is a time chart showing the updating process of gear position information during an upshift from second to third to fourth gear.

FIG. 14 shows updating of the gear position information (CURGPT, NEXTGPT) for speed change control and gear position information (CURGP, NEXTGP) when speed change control to the fourth gear is started although the speed change control from the second gear to the third gear is not yet completed.

When CURGPT and NEXTGPT coincide, since the block 48 determines that the speed change control is complete, the delay process on the speed ratio for calculation of the target engine torque is completed when both values become equal. However, by updating NEXTGPT when the speed change control is terminated, CURGPT does not coincide with NEXTGPT even when speed change control is performed sequentially and it is possible to prevent the delay process on the speed ratio for calculation of the target engine torque from being suspended midway.

Figure 15:
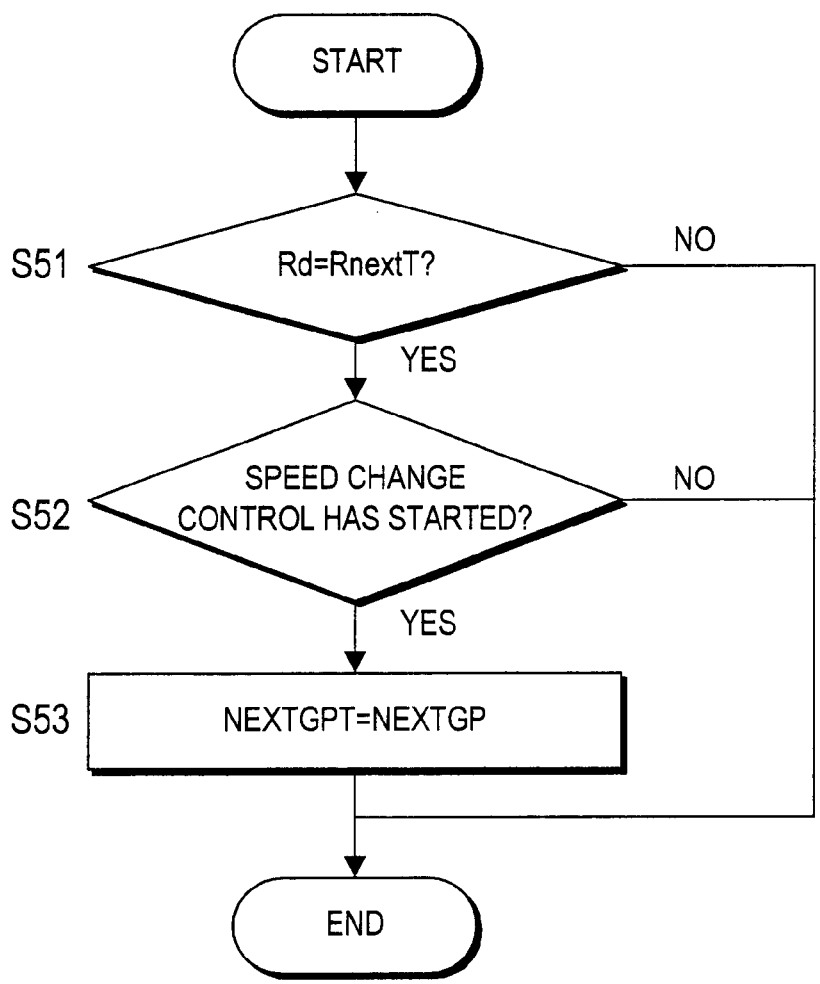
FIG. 15 is a flowchart showing another example of the updating process of gear position information.

Updating the gear position NEXTGPT after speed change which is used in speed change control may be adapted to detect the timing of starting speed change control and to be reset when speed change control starts. FIG. 15 shows this updating process.

In this manner, firstly in a step S51, it is determined whether or not speed change control is completed based on whether or not the delay speed ratio Rd has reached the speed ratio RnextT corresponding to the gear position NEXTGPT after speed change. When it is determined that speed change control is completed, it is determined in a step S52 whether or not speed change control has started again based on the value of NEXTGP and CURGPT. When it is determined that speed change control has started, the routine proceeds to a step S53 and NEXTGPT is updated to NEXTGP.

The blocks 46, 47 in FIG. 6 calculate respective speed ratios RcurT, RnextT corresponding to gear position information CURGPT, NEXTGPT for speed change control based on predetermined tables.

The block 48 determines whether or not speed change control is performed based on the gear position information CURGPT, NEXTGPT for speed change control. More precisely, when the values are not equal, it is determined that speed change control is being performed and the speed change control flag Fspc is set to "1" which shows that speed change control is being performed. When both values are equal, it is determined that speed change control is not performed and the speed change control flag Fspc is set to "0" which shows that speed change control is not being performed.

The block 49 selects a speed ratio used in calculation of the target engine torque in response to the value of the speed change control flag Fspc set by the block 48. More precisely, when it is determined that speed change control is being performed (Fspc=1), the delay speed ratio Rd calculated in the block 43 as the speed ratio Rne for calculation of the target engine torque is selected. When it is determined that speed change control is not being performed (Fspc=0), the speed ratio RcurtT before speed change is selected as the speed ratio Rne for calculation of the target engine torque.

The overall operation of performing the drive force control will be described below.

In the vehicle provided with the drive force control device, the target drive force is calculated based on the accelerator pedal operation amount APS and the vehicle speed VSP. The target engine torque is calculated by dividing the target drive force by the speed ratio for calculating the target engine torque in order to realize the target drive force, and the torque of the engine 1 is controlled by throttle opening control. In this manner, the drive force as required by the driver is realized and it is possible to maintain preferred performance characteristics.

At this time, when the transmission 2 is not performing speed change control, the speed ratio corresponding to the gear position at that time (=actual speed ratio) is used as the speed ratio for calculating the target engine torque. However during speed change control, the delay speed ratio with the delay on the actual speed ratio is used in order to prevent sharp variation in the target engine torque as a result of rapid variation in the speed ratio.

Furthermore a difference before and after completion of actual speed change is provided in the amount of delay of the delay speed ratio. The delay speed ratio varies so that shift shocks are suppressed until completion of actual speed change and varies so that a sharp variation in the drive force is suppressed after completion of actual speed change. Thus, it is possible to suppress both shocks during speed change control and a sharp variation in drive force.

Since the delay process should be performed at least during upshift which displays a tendency to generate troublesome shift shocks, the delay process may be prohibited during speed change control when the vehicle is coasting or during downshift at which time shift shocks do not present a problem. In this manner, it is possible to reduce the load on the control system.

A second embodiment of this invention will be described below.

Figure 16:
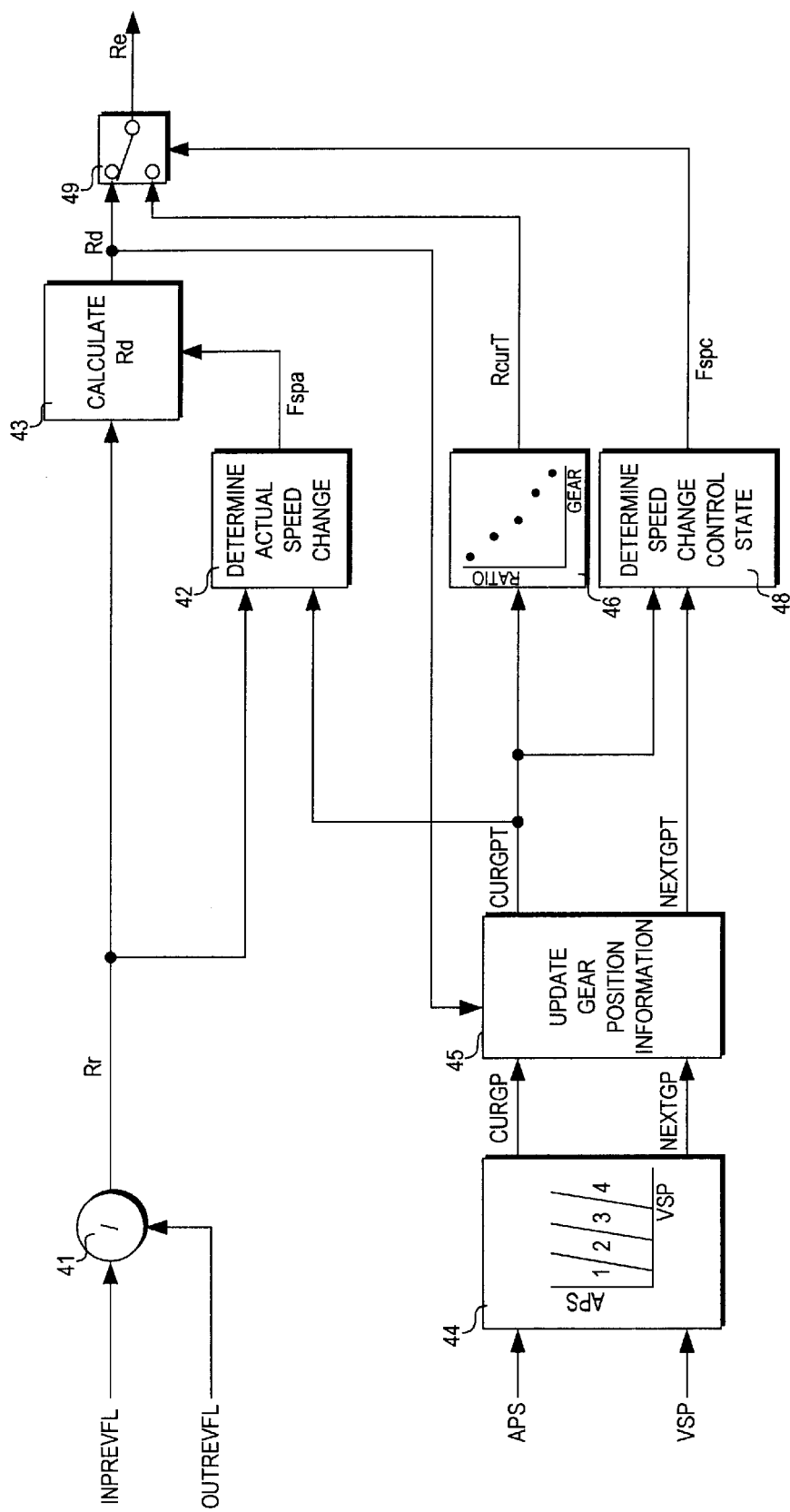
FIG. 16 is similar to FIG. 6, but is a block diagram of the calculation process of the speed ratio for calculation of the target engine torque according to a second embodiment of this invention.

FIG. 16 shows the calculation process for the speed ratio for calculating the target engine torque in the block 40. The actual speed change determination process in the block 42 is different from the previous embodiment. Furthermore since the speed ratio RnextT after speed change is not required by the block 42 when determining whether or not actual speed change is performed, the block 47 provided for this calculation is omitted. In other respects, this embodiment is the same as the previous embodiment.

Figure 17:
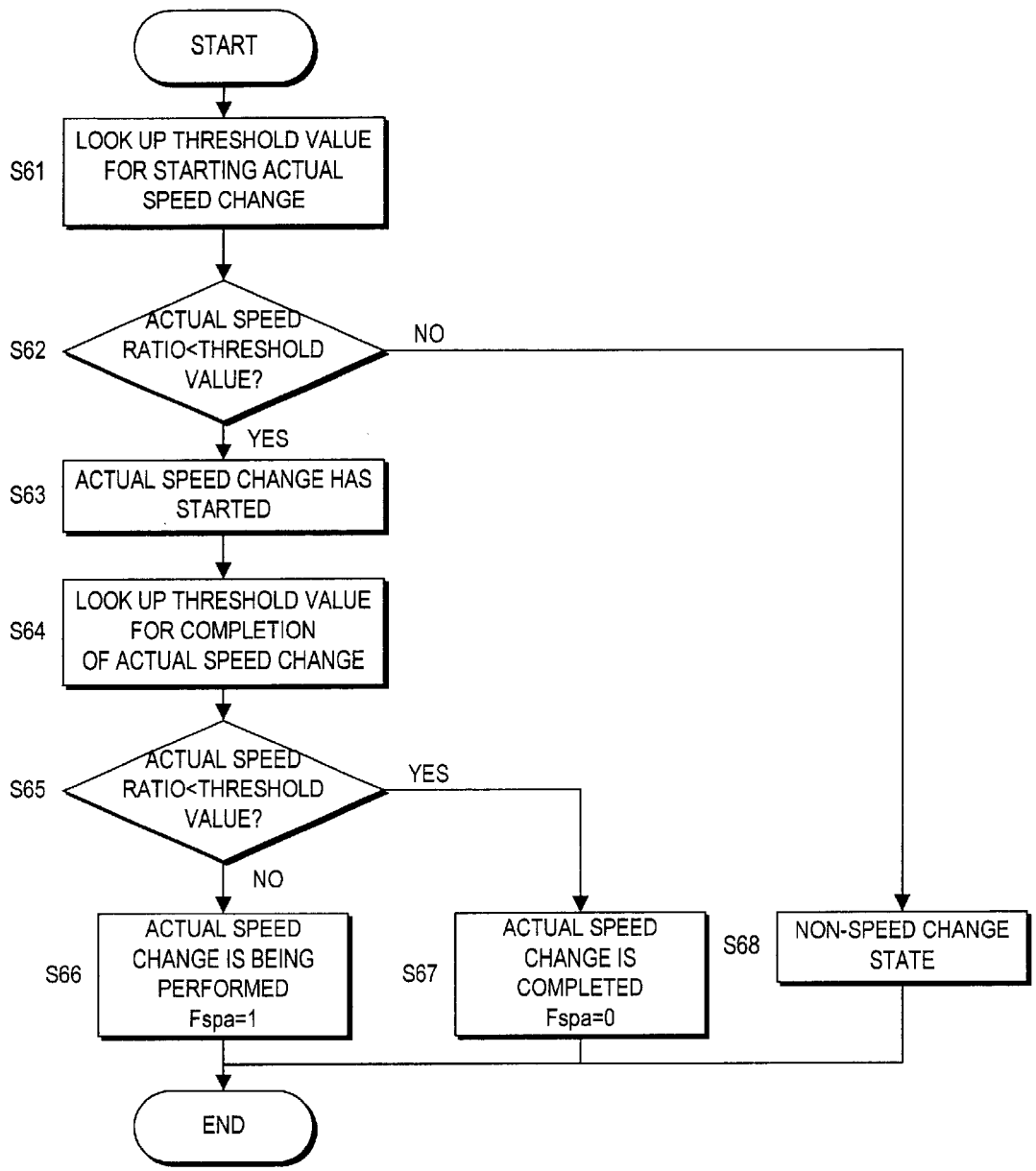
FIG. 17 is a flowchart showing another example of an actual speed change determination process.

FIG. 17 shows the actual speed change determination process performed by the block 42. Although this process is shown during upshift, the process during downshift is substantially similar and only the threshold values used for determination of actual speed change starting timing and the actual speed change completion timing and the sign in the steps S62, S63 are different.

Firstly in a step S61, a determination threshold value for starting actual speed change is calculated based on the value for CURGPT by looking up a predetermined table. When RcurT is taken to be a speed ratio corresponding to CURGPT, the determination threshold value for starting actual speed change is set to a value which is slightly smaller than RcurT.

In a step S62, it is determined whether or not the actual speed ratio Rr is smaller than the determination threshold value for starting actual speed change. When the actual speed ratio Rr is smaller than the determination threshold value for starting actual speed change, the routine proceeds to a step S63 and it is determined that actual speed change has started. When this is not the case, the routine proceeds to a step S68 and it is determined that speed change control is not performed.

In a step S64, a determination threshold value for the actual speed change completion is calculated based on CURGPT by looking up a predetermined table. The threshold value for the actual speed change completion is set to a value which is slightly larger than the speed ratio of the next higher gear position than CURGPT.

In a step S65, it is determined whether or not the actual speed ratio Rr is smaller than the threshold value for the actual speed change completion. When the actual speed ratio has not yet reached the threshold value for the actual speed ratio completion, the routine proceeds to a step S66 and it is determined that actual speed change is being performed (Fspa=1). When this is not the case, the routine proceeds to a step S67 and it is determined that actual speed change is completed (Fspa=0).

Figure 18:
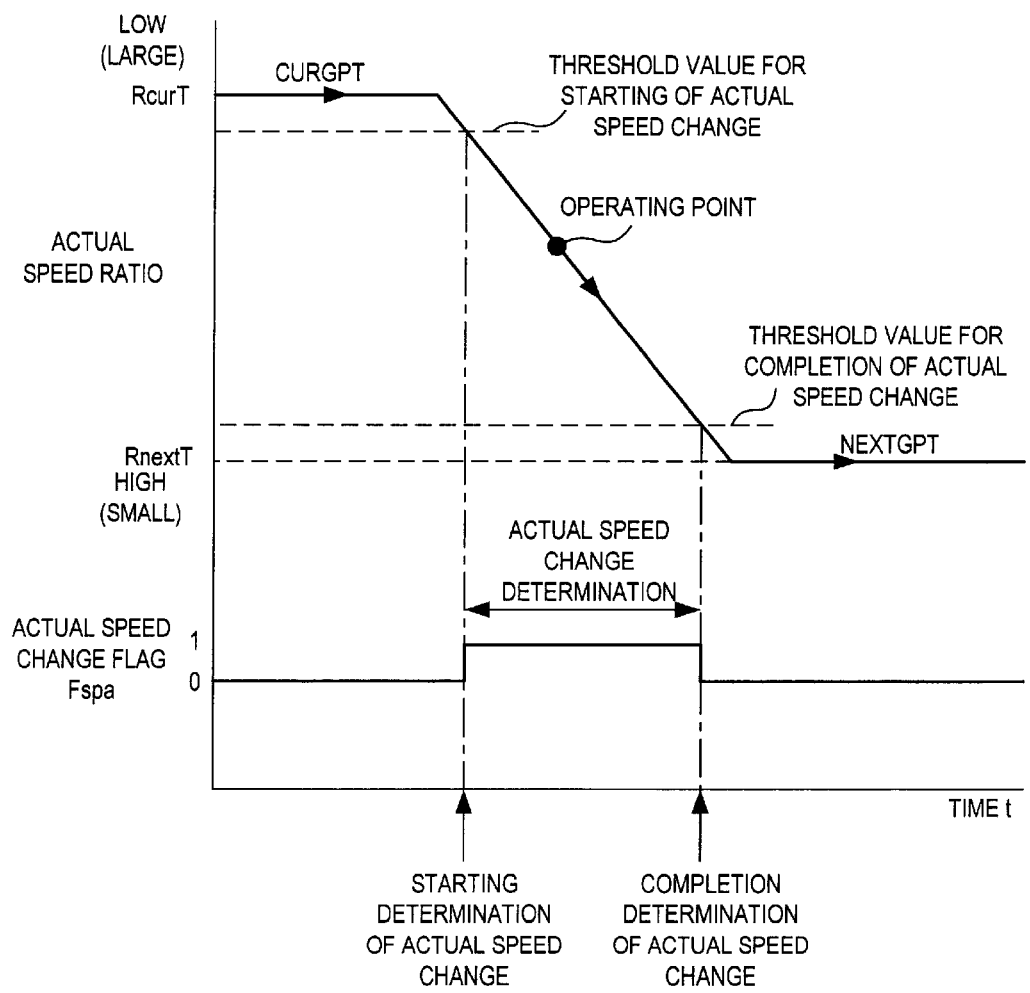
FIG. 18 is a time chart showing the determination of the actual speed change during upshift.

FIG. 18 shows the actual speed change determination process during upshift. The actual speed ratio Rr begins to decrease from RcurT which corresponds to CURGPT and when it is smaller than the determination threshold value for starting actual speed change, it is determined that actual speed change has started. In this case, the actual speed change flag Fspa is set to "1". It is determined that actual speed change is being performed as long as the actual speed ratio Rr takes a value between the determination threshold value for starting actual speed change and the threshold value for the actual speed change completion. In this case, the actual speed change flag Fspa continues to be set to a value of "1". When the speed change operation proceeds and the actual speed ratio Rr becomes smaller than the threshold value for the actual speed change completion, it is determined that actual speed change is completed and the actual speed change flag Fspa is set to "0". In this manner, it is not determined that actual speed change has started as soon as the actual speed ratio becomes smaller than RcurT. Furthermore it is determined that the actual speed change is completed before the actual speed ratio reaches RnextT. This is in order to take into account detection errors in the sensors and delays in the speed change operation in the same manner as the previous embodiment.

This invention can be variously applied to vehicles mounting a transmission having non-continuous speed ratios. It is possible to apply the invention to a vehicle mounting a continuously variable transmission controlled in order to vary a speed ratio in a step manner in the same manner as the above automatic transmission.

The entire contents of Japanese Patent Application P2000-389926 (filed Dec. 22, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A vehicle drive system with an automatic transmission connected to an engine, the transmission having a plurality of gear positions for varying a speed ratio, the vehicle drive system comprising:
    a sensor which detects a running condition of the vehicle; and
    a controller configured to:
        calculate a target drive force based on the running condition of the vehicle;
        calculate a target engine torque by dividing the target drive force by a speed ratio corresponding to a gear position before starting speed change operations;
        calculate a delay speed ratio which varies with a delay on an actual speed ratio of the transmission;
        calculate the target engine torque by dividing the target drive force by the delay speed ratio while the actual speed ratio is undergoing variation; and
        control the engine torque to coincide with the target engine torque.

2. The vehicle drive system as defined in claim 1, wherein the controller further functions to:
    calculate the target engine torque by dividing the target drive force by the delay speed ratio after the completion of actual speed change.

3. The vehicle drive system as defined in claim 2, wherein the controller further functions to:
    vary an amount of delay of the delay speed ratio to the actual speed ratio in response to whether or not the actual speed ratio is undergoing variation.

4. The vehicle drive system as defined in claim 1, wherein the controller further functions to:

set an amount of delay of the delay speed ratio to the actual speed ratio to be greater during upshift than during downshift.

5. The vehicle drive system as defined in claim 1, wherein the controller further functions to:

use the actual speed ratio in the calculation of the target engine torque during downshift instead of the delay speed ratio.

6. The vehicle drive system as defined in claim 1, wherein the controller further functions to:

use the actual speed ratio in the calculation of the target engine torque instead of the delay speed ratio when the actual speed ratio is larger than the delay speed ratio.

7. The vehicle drive system as defined in claim 1, wherein the controller further functions to:

use the actual speed ratio in the calculation of the target engine torque during vehicle coasting states instead of the delay speed ratio.

8. The vehicle drive system as defined in claim 1, wherein the controller further functions to:

calculate the delay speed ratio by limiting the variable speed of the delay speed ratio.

9. The vehicle drive system as defined in claim 1, wherein the controller further functions to:

calculate the delay speed ratio by adding a value to the speed ratio of the gear position before speed change, the value calculated by multiplying the difference of the actual speed ratio and the speed ratio of the gear position before speed change by a predetermined coefficient.

10. The vehicle drive system as defined in claim 9, wherein the controller further functions to:

make the predetermined coefficient approach a value of one after completion of actual speed change.

11. The vehicle drive system as defined in claim 1, wherein the controller further functions to:

use the delay speed ratio as the speed ratio for calculation of the target engine torque until the delay speed ratio reaches the actual speed ratio.

12. A vehicle drive system with an automatic transmission connected to an engine, the transmission having a plurality of gear positions for varying a speed ratio, the vehicle drive system comprising:

means for detecting a running condition of the vehicle;

means for calculating a target drive force based on the running condition of the vehicle;

means for calculating a target engine torque by dividing the target drive force by a speed ratio corresponding to a gear position before starting speed change operations;

means for calculating a delay speed ratio which varies with a delay on an actual speed ratio of the transmission;

means for calculating the target engine torque by dividing the target drive force by the delay speed ratio while the actual speed ratio is undergoing variation; and means for controlling the engine torque to coincide with the target engine torque.

\* \* \* \* \*